United States Patent [19]
Schneider

[11] Patent Number: 6,056,177
[45] Date of Patent: May 2, 2000

[54] COLLAPSIBLE STORAGE CONTAINER FOR VEHICLES

[76] Inventor: Robert Schneider, 2873 SW. Brighton Way, Palm City, Fla. 34990

[21] Appl. No.: 09/163,231

[22] Filed: Sep. 29, 1998

[51] Int. Cl.[7] .................................................... B60R 7/00
[52] U.S. Cl. .............................. 224/401; 220/4.28; 220/6; 224/539; 224/542; 224/925
[58] Field of Search ..................................... 224/401, 497, 224/498, 499, 314, 328, 542, 543, 925, FOR 33; 220/428, 6, 7, 9.2, 9.3, 334, 339, 340, 4.29, 523, 524, 521, 529, 532, 254, 256, 259, 826; 217/15, 46, 47

[56] References Cited

U.S. PATENT DOCUMENTS

| | | | |
|---|---|---|---|
| 2,914,210 | 11/1959 | Paston ........................................... | 220/6 |
| 3,130,850 | 4/1964 | Oakley et al. ................................ | 220/6 |
| 3,611,994 | 10/1971 | Bailey ....................................... | 119/496 |
| 5,253,763 | 10/1993 | Kirkley et al. ........................... | 206/600 |
| 5,568,890 | 10/1996 | Magee et al. . | |
| 5,853,116 | 12/1998 | Schreiner ................................ | 224/404 |

*Primary Examiner*—Gregory M. Vidovich
*Assistant Examiner*—Maerena W. Brevard
*Attorney, Agent, or Firm*—McHale & Slavin

[57] ABSTRACT

A collapsible storage container for mini-vans and sports utility vehicles having a floor panel, a front wall, a back wall, and a pair of side walls. A partition wall extends between the front and back walls, separating the container into separate compartments. The side walls and the partition wall are hingedly attached to the floor panel and selectively fold flat against the floor panel. The front and back walls are two-piece members, each comprising a top portion and a lower portion. Each upper portion is hingedly connected along a seam to the corresponding lower portion. In turn, each lower portion is attached to the floor panel. The front wall lower portion is hingedly attached to the floor panel and may be lowered forward to allow access to the interior of the container. The container also includes a top panel that covers the contents of the container. Doors in the top panel provide access to the container interior. The top panel collapses along with the front and back walls, the side walls, and the partition wall, placing the container in a compact orientation.

17 Claims, 3 Drawing Sheets

COLLAPSIBLE STORAGE CONTAINER FOR VEHICLES

FIELD OF THE INVENTION

This invention relates to the use of storage containers in vehicles and, in particular to a collapsible storage container that allows unrestricted cargo room when placed in a collapsed position and a large storage capacity when the container is unfolded into an item-storing orientation.

BACKGROUND OF THE INVENTION

Sport utility vehicles and mini-vans are a class of vehicles with sales that exceed most passenger automobiles combined. The advantage of such vehicles is the ability to haul passengers, while providing an enclosed cargo room not possible in a conventional automobile. The sport utility vehicle further lacks the stigma of a station wagon by including off-road capabilities, making them suitable for many types of uses.

Sport utility and mini-van vehicles include the ability to lay rear seats down so as to increase the available cargo area for hauling long items. When the vehicle is used to haul large items, items that are commonly carried in the rear section of the vehicle must be moved or removed to make room for the cargo to be hauled. For instance, flashlights, jumper cables, tools, flares, and wash rags are but a few items that are typically carried in a vehicle. Unfortunately, the cargo area of a sport utility vehicle or mini-van also serves as the trunk. Therefore, items typically placed in the rear of such a vehicle must be displaced so as not to interfere with additional cargo.

Further, the cargo area of a sport utility or mini-van vehicle is not amenable to concealing items placed therein. For this reason, a number of gear-concealing devices has been marketed and/or patented. For example, one option available in many mini-vans and sport utility vehicles is a retractable cover that visually shields stowed cargo. A cover typically covers a large area of cargo section, but is not effective when the vehicle seats are removed or folded down. In such instances the stowed gear is visible from many angles and may be attractive to thieves.

Retractable covers cannot support weight and their use typically limits the amount of storage room in a given vehicle. In addition, retractable covers may also have to be removed to provide uninhibited access to the vehicle cargo area. For instance, the cargo area may be used on an everyday basis to store flashlights, flares, and the like items useful for roadside emergencies. If the vehicle is used by a salesman, the cargo area could be filled with notebooks, samples, and other similar materials. If the cargo area is used with such everyday items, and the vehicle owner wishes to haul large items, the everyday items in the cargo area must be relocated, or removed completely. Often, this requires that such items are moved into plain sight, inviting theft or vandalism.

U.S. Pat. No. 5,568,890 discloses a device directed to the storage of items in a sport utility vehicle; however, this device consumes a majority of the available cargo space and does not provide any means for maximizing the cargo area while the device is unused.

What is lacking in the art is a storage container that includes advantages of the known devices, while addressing the shortcomings they exhibit. The container should fold flat to allow efficient utilization of the cargo area when the container is not in use. The device should also store numerous items securely, while providing structural integrity sufficient to allow support of items placed on top of the container. The device should allow simultaneous storage of items and support of oversized cargo.

SUMMARY OF THE INVENTION

The present invention is a collapsible storage container particularly useful for storing items within the back of minivans and sport utility vehicles. The container comprises a floor panel bordered by a front wall, a back wall, and a pair of side walls. A partition wall extends between the front and back walls, dividing the container into two separate compartments.

The side walls, and the partition wall, are hingedly attached to the floor panel and selectively folded flat against the floor panel. The front and back walls are two-piece members, each comprising a top portion and a lower portion. Each upper portion is hinged, along a seam hinge, to the corresponding lower portion. In turn, each lower portion is attached to the floor panel: the front wall lower portion is hingedly attached, and the back wall lower portion is rigidly connected. The front wall may be lowered forward, in a doorlike manner, to allow access to the interior of the container.

The container also includes a top panel that covers the contents of the container. The top panel includes doors that provide access to the container interior. The container also includes a positioning means that extendably maintains the top panel against the container walls.

With the side and partition walls folded into a compact orientation, flat against the floor panel, the front and back walls may be folded along their seam hinges to lie against the collapsed side and partition walls. The top panel, in turn, lowers via the positioning means to assume a collapsed state. In this compact state, the device occupies only a fraction of the space required by the fully expanded orientation.

Therefore, an objective of the present invention is to provide a collapsible storage container that will hold items securely while the container is in an expanded orientation, yet will maximize the available cargo space within a vehicle by folding flat, into a compact orientation.

An additional objective of the present invention is to provide a collapsible storage container that will conceal items placed therein when the vehicle is unoccupied.

Still a further objective of the present invention is to provide a collapsible storage container that will allow access to items within the container even if the container top panel is supporting, or is blocked by, supplemental items.

Still an additional objective of the present invention is to provide a collapsible storage container that is compact enough to be left within a vehicle when not in use.

It is also an objective of the present invention to provide a collapsible storage container that supports oversized items placed thereupon.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
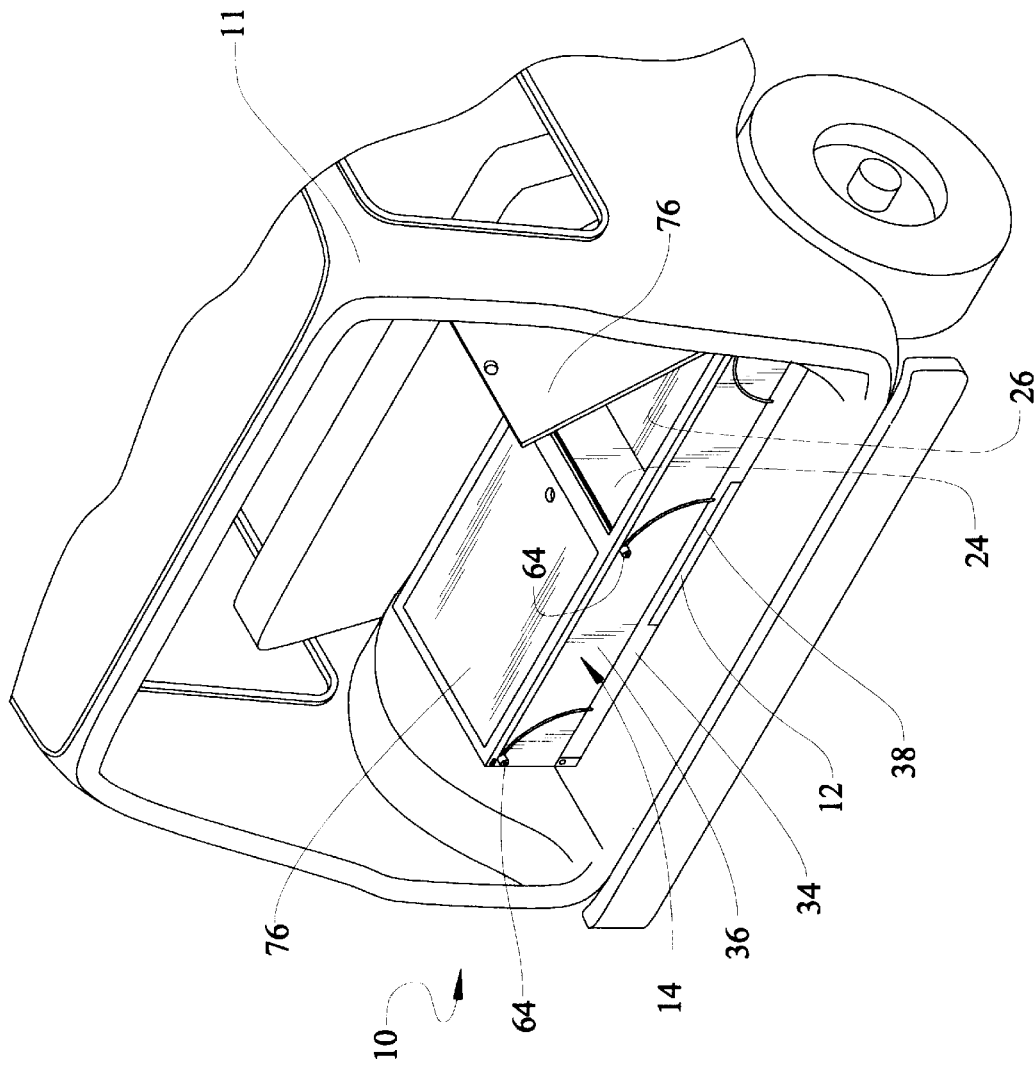
FIG. 1 is a pictorial view of the collapsible storage container of the present invention, shown in use in a sport utility vehicle.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Figure 2:
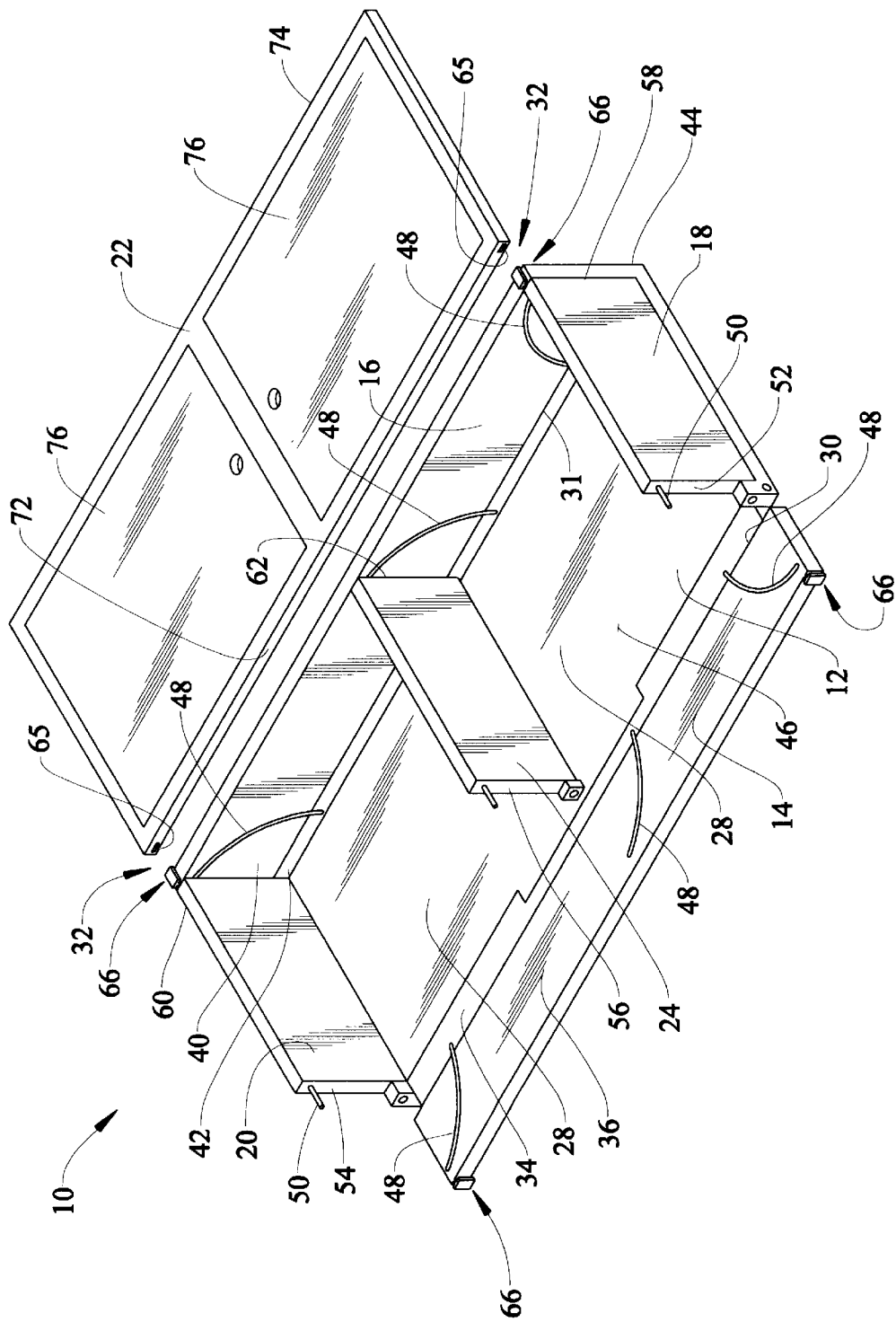
FIG. 2 is a perspective view of the container shown in FIG. 1, showing the front panel in an open position.

Now, with reference to FIGS. 1 and 2, the collapsible storage container 10 of the present invention is shown. By way of overview, the container 10 includes a floor panel 12, a front wall 14, a back wall 16, a first side wall 18, a second side wall 20, and a top panel 22. The container 10 also includes a partition wall 24 that divides the container interior 26 into two separate compartments 28. The side walls 18,20 and partition wall 24 are selectively collapsible. The front and back walls 14,16 each include seam hinges 30,31 that allow the front and back walls to fold downward, onto the collapsed side and partition walls 18,20,24, placing the container 10 in a compact orientation. The container 10 includes a positioning means 32 for extendably supporting the top panel 22. This positioning means 32 allows the top panel 22 to remain in a raised or collapsed state, in accordance with the expanded or compact state of the container 10. The container 10 will now be discussed in detail.

As seen in FIG. 2, the container 10 is an essentially-rectangular box internally divided into two compartments 28. The container front wall 14 is hingedly attached to the floor panel 12. In this way, the front panel 12 can be folded forward to provide access to the container interior 26. As can be seen with additional reference to FIG. 4, the front wall 14 is divided into two sections by a seam hinge 30 that extends the length of the front wall. In this way, the front wall 14 comprises a lower portion 34 and an upper portion 36. The lower portion 34 is hingedly attached to the front edge 38 of the floor panel 12; the upper portion 36 is, in turn, hinged to the lower portion, via the above-mentioned seam hinge 30. As seen with joint reference to FIGS. 2 and 3, this dual-hinge arrangement allows the front wall 14 to fold, providing access to the container interior 26, and inward, to place the container in a compact orientation. FIG. 2 shows the front wall 14 folded forward. FIG. 4 shows the front and back wall upper portions 36,40 folded inward, allowing the upper portions to lie against collapsed side and partition walls 18,20,24. This inward folding will be described more fully, below. Although the container 10 has been described as having a hinged partition wall 24, the partition wall may alternatively slide into and out of the container interior 26, being held in place through a tongue-and-groove arrangement. Additionally, more than one partition wall 24 may be used; the partition wall may also be removed to accommodate large items.

The back wall 16 is similar to the front wall. That is, the back wall 16 includes an upper portion 40 hingedly linked to a back wall lower portion 42 via a seam hinge 31. However, unlike the front wall 14, which is hingedly connected to the floor panel front edge 38, the back wall lower portion 42 is rigidly attached to the floor rear edge 44. The rear wall lower portion 42 may be hinged, if desired, but the preferred embodiment employs a rigid connection between the floor panel rear edge 44 and the back wall 16.

Figure 4:
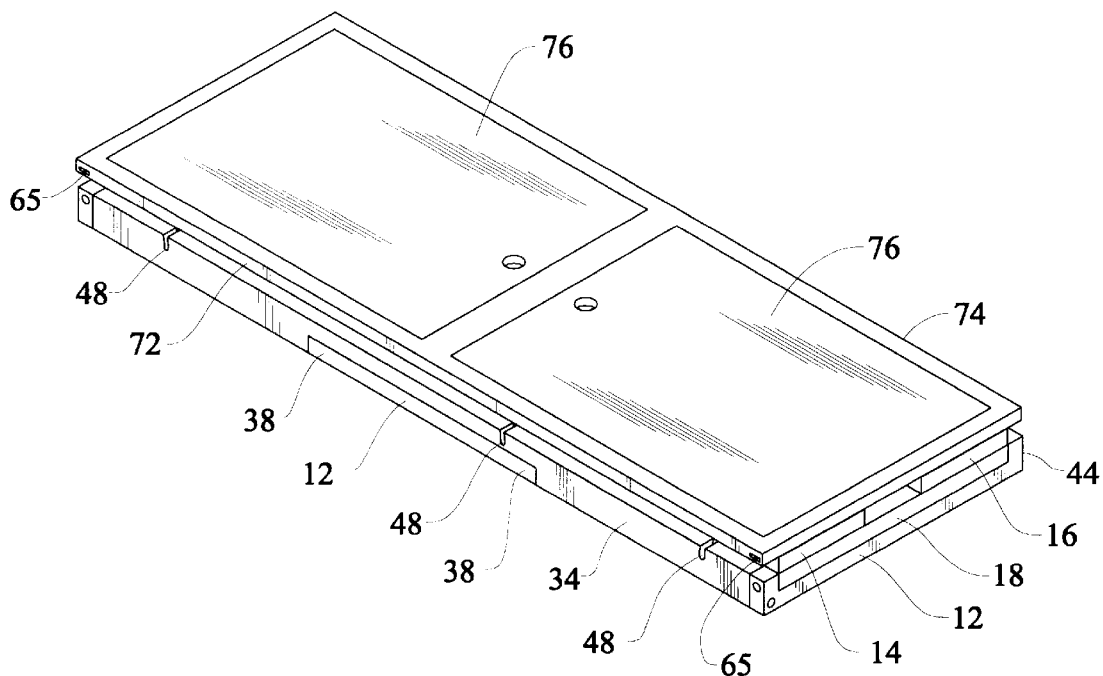
FIG. 4 is a pictorial view of the container of the present invention, shown in a collapsed orientation.
Figure 5:
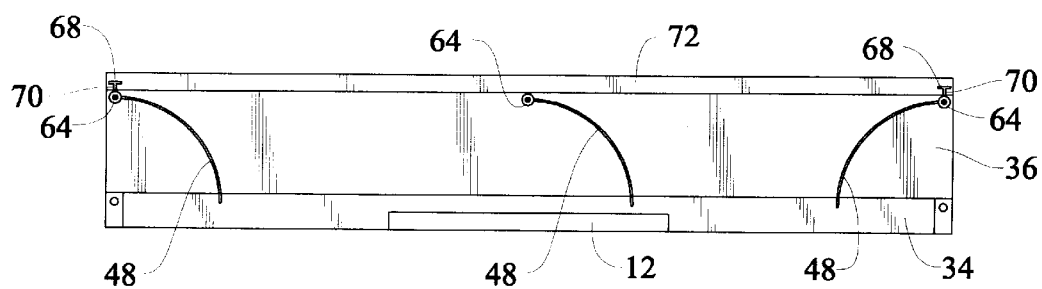
FIG. 5 is a front elevation view of the container shown in FIG. 1.

In keeping with the objectives of the present invention, the side and partition walls 18,20,24 are collapsible and will selectively fold downward to lie flat against the floor panel top surface 46. As shown in FIG. 4, the side walls 18,20 fold toward the center of the floor panel top surface 46. The partition wall 24 may fold to the left or right; in the preferred embodiment, the partition wall folds to the right. As shown in FIG. 2, the front and back walls 14,16 each include guide arcs 48 that govern motion of the side and partition walls 18,20,24. In a preferred embodiment, the guide arcs 48 are curved channels cut through the front and back walls 14,16. The channels 48 are sized to engage tracking pins 50 that extend from the side and partition walls 18,20,24. As seen in FIGS. 2 and 5, the front edges 52,54,56 of the partition walls 18,20,24 each include a tracking pin 50 that extends orthogonally therefrom. Similarly, the rear edges 58,60,62 of the side and partition walls 18,20,24 each also include a tracking pin 50 extending orthogonally therefrom. The tracking pin 50 and guide arc 48 arrangement allows the side and partition walls 18,20,24 to move in a controlled manner between an upright position and a collapsed position.

Additionally, the tracking pins 50 on the side and partition wall 18,20,24 front edges 52,54,56 include spring-biased locking caps 64 threadably disposed thereupon. When tightened, the locking caps 64 frictionally engage the front wall 14. As a result, tightening the locking caps 64 adjustably secures the side and partition walls 18,20,24 in user-selected orientations, such as fully-upright or fully-collapsed. By including these locking caps 64, the side and partition walls 18,20,24 may also be secured at intermediate points along the guide arcs 48, so that the container 10 may assume a partially-collapsed, yet structurally-rigid, orientation.

Figure 3:
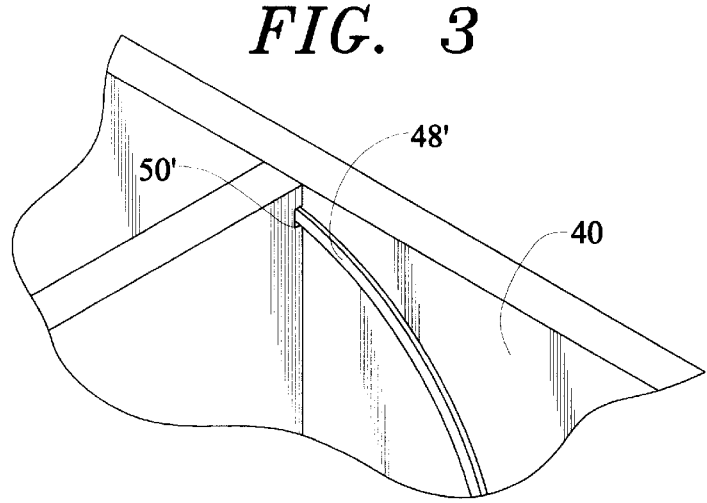
FIG. 3 is a partial view of an alternate embodiment of the container shown in FIG. 1.

In an alternate embodiment, shown in FIG. 3, the guide arcs 48' may be curved ridges that extend from the front and back walls 14,16. In this alternate embodiment, the side and partition walls 18,20,24 each include a tracking notch 50' cut into the front edge 52,54,56 thereof; the rear edges 58,60,62 of those walls also each include an arc-engaging tracking notch.

In further keeping with the objectives of the present invention, a positioning means 32 maintains the top panel 22 in proximity with the container walls 14,16,18,20,24. More specifically, the positioning means 32 employs a pair of attachment tracks 65 that cooperate with linking posts 66 to dynamically connect the top panel 22 with the front and back walls 14,16. As seen in FIGS. 2 and 5, the linking posts 66 are T-sectioned members, each having an enlarged head portion 68 and an elongated neck portion 70. The attachment tracks 65 have C-shaped cross sections, and each track extends between the top panel front edge 72 and the top panel back edge 74. Each attachment track 65 is associated with two linking posts 66, slidably retaining the head portion 68 of each associated post. When the container 10 is moved between an expanded orientation, shown in FIG. 1, and a compact orientation, shown in FIG. 4, the head portion 68 of each linking post 66 translate and pivots within the attachment tracks 65.

The method of collapsing the container 10 of the present invention will now be discussed. To move the container 10 from an expanded orientation into a compact orientation, the side walls 18,20 are folded downward, toward the center of the floor panel 12. The partition wall 24 is also folded downward to lie against the floor panel 12. Once the side and partition walls 18,20,24 are folded against the floor panel 12, the upper portions 36,40 of the front and back walls 14,16 are folded downward onto the now-collapsed walls 18,20, 24. As the front and back wall upper portions 36,40 fold down, the Linking posts 66 cooperate with the attachment tracks 65 to draw the top panel 22 downward, as well. The container 10 is placed in an expanded orientation by reversing the above-described steps.

To increase the utility of the present invention, the container top panel 22 includes door panels 76 that allow access through the top panel, into the container interior 26. These doors 76 may slide or be hinged, as desired.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. A collapsible storage container for mini-vans and sports utility vehicles:
    a first panel;
    a first set of parallel walls movably attached to said first panel, each wall of said first set of walls comprises a first portion hingedly attached to a second portion, said first portion being attached to said first panel;
    a second set of parallel walls hingedly attached to said first panel, said second set of walls aligned transverse to said first set of walls;
    a second panel having a width substantially equal to the width of said first panel, and a length substantially equal to the length of said first panel; and
    means for extendably and reversibly positioning said second panel with respect to said first panel,
    whereby each wall of said second set of walls is selectively positionable between a first position and a second position, with respect to said first panel, and whereby said each wall of said first set of walls will fold onto and contact each of said walls of said second set of walls when said second set of walls is in said second position.

2. The collapsible storage container of claim 1, further including a guiding means for directing said second set of walls between said first position and said second position.

3. The collapsible storage container of claim 2, wherein said guiding means includes:
    at least one tracking pin extending from each wall of said second set of walls;
    a plurality of channels disposed within each wall of said first set of walls, each of said tracking pins adapted to engage a corresponding one of said channels.

4. The collapsible storage container of claim 3, including at least one locking cap disposed on said at least one tracking pin.

5. The collapsible storage container of claim 2, wherein said guiding means includes:
    at least one tracking notch disposed within each wall of said second set of walls;
    a plurality of ridges disposed along each wall of said first set of walls, each of said notches being adapted to engage a corresponding one of said ridges.

6. The collapsible storage container of claim 1, wherein said means for positioning includes
    at least one linking post extending from each wall of said first set of walls
    at least one attachment track disposed along said second panel, said attachment track constructed and arranged to slidably engage said at least one linking post,
    whereby said second panel moves in response to motion of said first set of walls.

7. The collapsible storage container of claim 6, wherein
    said at least one linking post includes an enlarged head portion; and
    said at least one attachment track is a C-sectioned member including flanges that slidably retain said head portion;
    whereby folding said upper portions moves said second panel between a first position and a second position.

8. The collapsible storage container of claim 1, wherein at least one wall of said first set of walls is hingedly attached to said first panel.

9. The collapsible storage container of claim 1, further including:
    at least one door disposed within said second panel.

10. A collapsible storage container for mini-vans and sport utility vehicles comprising:
    a first panel;
    a first set of parallel walls movably attached to said first panel, each wall of said first set of walls comprises a first portion hingedly attached to a second portion, said first portion being attached to said first panel;
    a second set of parallel walls hingedly attached to said first panel, said second set of walls aligned transverse to said first set of walls;
    a second panel having a width substantially equal to the width of said first panel, and a length substantially equal to the length of said first panel;
    a guiding means for directing said second set of walls between a first position and a second position; and
    means for extendably and reversibly positioning said second panel with respect to said first panel, said means for positioning including at least one linking post extending from each wall of said first set of walls; and at least one attachment track disposed along said second panel, said attachment track constructed and arranged to slidably engage said at least one linking post,
    whereby each wall of said second set of walls is selectively positionable between a first position and a second position, with respect to said first panel, whereby said each wall of said first set of walls will fold onto and contact each of said walls of said second set of walls when said second set of walls is in a second position, and whereby said second panel moves in response to motion of said first set of walls.

11. The collapsible storage container of claim 10, wherein said guiding means includes:
    at least one tracking pin extending from each wall of said second set of walls; and
    a plurality of channels disposed within each wall of said first set of walls, each of said tracking pins adapted to engage a corresponding one of said channels.

12. The collapsible storage container of claim 11, wherein at least one wall of said first set of walls is hingedly attached to said first panel.

13. The collapsible storage container of claim 11, wherein said second panel includes at least one door disposed therein.

14. The collapsible storage container of claim 10, wherein said guiding means includes:
   - at least one tracking notch disposed within each wall of said second set of walls;
   - a plurality of ridges disposed along each wall of said first set of walls, each of said notches being adapted to engage a corresponding one of said ridges.

15. The collapsible storage container of claim 11 further including at least one selectively removable wall slidably engaging at least one of said walls of said first set of walls.

16. The collapsible storage container of claim 11 further including at least one selectively removable wall slidably engaging at least one of said walls of said second set of walls.

17. A collapsible storage container for mini-vans and sports utility vehicles:
   - a first panel;
   - a first set of parallel walls movably attached to said first panel;
   - a second set of parallel walls hingedly attached to said first panel, said second set of walls aligned transverse to said first set of walls;
   - a second panel having a length substantially equal to the width of said first panel, and a length substantially equal to the length of said first panel;
   - a guiding means operatively provided between said first and second sets of walls for directing said second set of walls between a first position and a second position; and
   - means for extendably and reversibly positioning said second panel with respect to said first panel,
   - whereby each wall of said second set of walls is selectively positionable between said first position and said second position, with respect to said first panel.

* * * * *